United States Patent Office 2,768,977
Patented Oct. 30, 1956

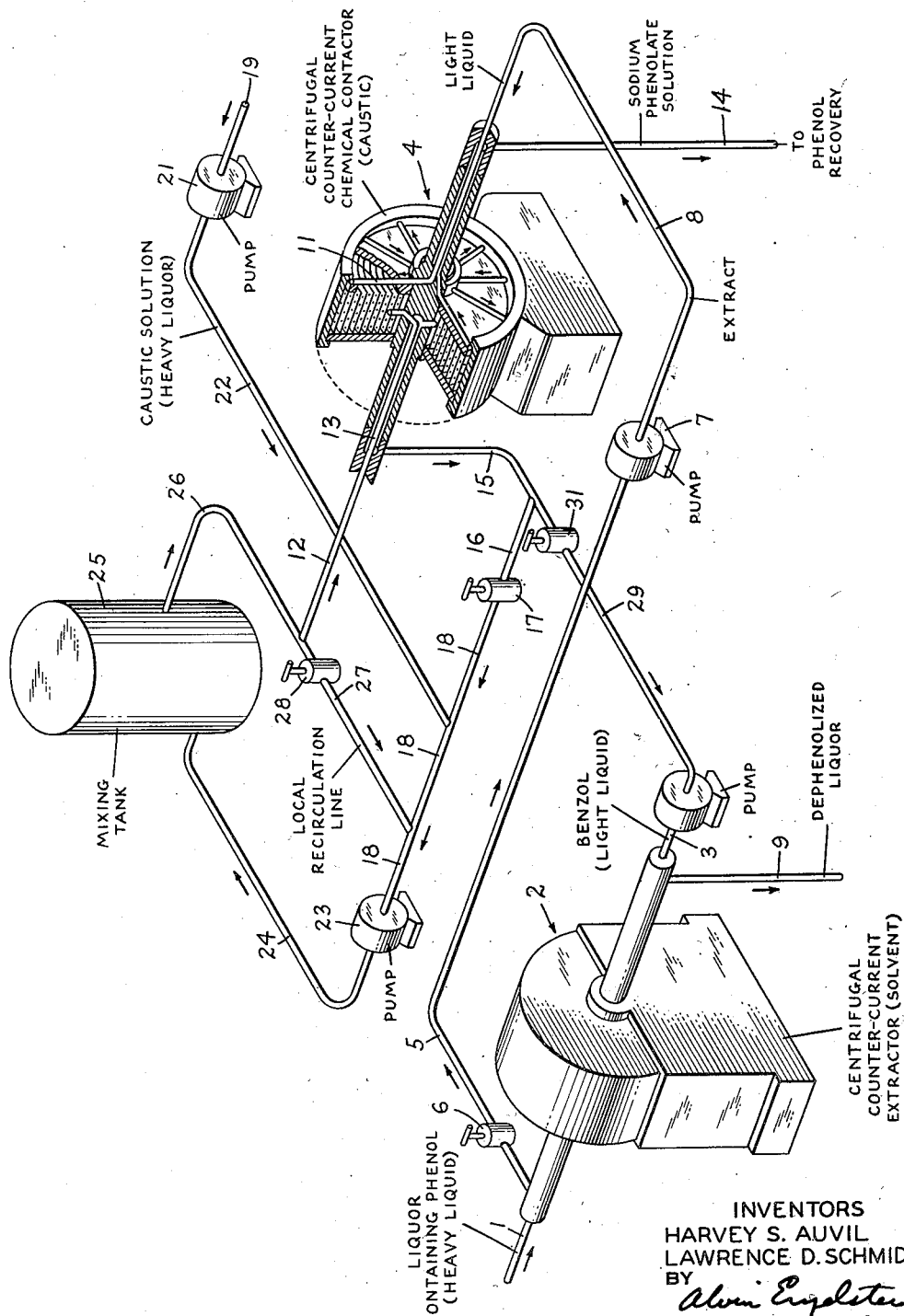

2,768,977

ELIMINATION OF PHENOL FROM COKE PLANT EFFLUENTS

Harvey S. Auvil, Ashland, Ky., and Lawrence D. Schmidt, New York, N. Y., assignors to Allied Chemical & Dye Corporation, New York, N. Y., a corporation of New York Application August 2, 1955, Serial No. 525,892

5 Claims. (Cl. 260—627)

This invention relates to dephenolizing of industrial liquors and more particularly refers to a new and improved method for the removal and recovery of phenol from coke-plant ammonia liquor.

In the carbonization of coal there is produced roughly about one pound of phenol per ton of coal. About ninety percent of this phenol is recovered in conventional coke plant phenol recovery systems and about 10% of the phenol escapes ultimately to the sewer and thus to the river, lake or stream. While the amount of phenol per ton of coal carbonized is small, this value when multiplied by the millions of tons of coal carbonized annually aggregates a substantial total tonnage of phenol lost. Of equal and perhaps greater importance is the pollution effect of the phenol making it desirable and indeed mandatory to eliminate the phenol contaminant of liquor before discharging it into the bodies of water. The conventional method of removal of phenol from coke-plant ammonia liquor generally involves washing the liquor with a fluid which has preferential affinity for phenol followed by separating the phenol from the wash fluid and returning the stripped wash fluid for further removal of phenol from the liquor. A typical method is to pass a solvent oil countercurrent to the liquor in a column to extract phenol and then treat the solvent oil with caustic to remove the phenol as sodium phenolate and return the solvent oil for further contact with the liquor. The cost of caustic is, of course, a major item in phenol removal. Theoretically, about $4/10$ of a pound of caustic is required for reaction with one pound of phenol. In commercial practice more than three times the theoretical amount of caustic required is commonly consumed and even under these conditions substantial amounts of phenol escape ultimately into the effluent. Other factors of importance in dephenolization of liquor are effectiveness in reducing the effluent to a low phenol content, flexibility of operation, i. e. ability to operate over a wide range of conditions with respect to phenol content and amount of feed liquor, low operating costs, low investment costs and compactness of equipment.

An object of the present invention is to provide an efficient and economical process for removing phenol from industrial liquors.

Another object is to provide a system for treating industrial liquors to remove phenol therefrom in simple equipment, compact in design and efficient in operation.

A further object is to provide a method for recovering valuable phenol from industrial liquors with the consumption of reduced amounts of caustic.

Other objects and advantages will be apparent from the following description and accompanying drawing.

In accordance with the present invention, aqueous liquor containing phenol is passed through a centrifugal countercurrent contactor countercurrent to and in intimate contact with a liquid solvent for phenol which is immiscible in water and has lower specific gravity than water to effect extraction of phenol from the liquor, discharging the dephenolized liquor, passing the solvent light liquid containing dissolved phenol through a second centrifugal countercurrent contactor countercurrent to and in intimate contact with an aqueous caustic solution which has a specific gravity greater than the solvent liquid to effect removal of the phenol from the solvent liquid and reaction of the phenol with the caustic to form a phenolate solution, discharging solvent liquid after contact with the caustic solution from the second centrifugal countercurrent contactor, recycling one portion of said solvent liquid for contact with liquor containing phenol in the first centrifugal countercurrent contactor, intimately admixing another portion of the liquid solvent from the second centrifugal countercurrent contactor with caustic solution and passing said intimate mixture of liquid solvent and caustic solution into the second centrifugal countercurrent contactor, separating the intimate mixture of liquid solvent and caustic solution into its components as it passes through the second centrifugal contactor, the separated caustic solution continuing countercurrent to solvent liquid containing dissolved phenol introduced into the second contactor, and the liquid solvent from the intimate mixture dispersing in said countercurrent flowing solvent liquid and discharging therewith from the second contactor.

The accompanying drawing is a diagrammatic flow sheet illustrating one method of practicing the invention.

Referring to the drawing, the feed material entering through line 1 is an aqueous industrial liquor containing phenol, usually in small amounts, generally less than 10% of the liquor and more often less than 1%. The present invention is particularly directed to liquors from coke oven operations, especially coke-plant ammonia liquor which is fed to the ammonia still operations of a coke plant consisting principally of water containing ammonia and contaminated by dissolved impurities such as phenol, acid gases and salts. The term phenol as used herein is intended to include the homologues of phenol such as cresols and xylols. While the amount of phenol in ammoniacal liquor would vary in each plant a phenol concentration of from about 700 to about 1500 parts per million may be considered as typical. The acid gases in the ammoniacal liquor are usually hydrogen sulfide, and carbon dioxide. Extraction of the phenol from the liquor is accomplished in a centrifugal countercurrent extractor 2 into which through line 3 enters a solvent which passes countercurrent to and in intimate contact with the liquor containing phenol. Centrifugal countercurrent extractor 2 may be any conventional centrifugal extractor wherein two liquids of different specific gravity are passed continuously and countercurrently to one another while being subjected to centrifugal action thereby effecting intimate contact between the two liquids and separation of the two liquid phases. These centrifugal countercurrent extractors are articles of commerce which may be purchased in the market. The construction of centrifugal countercurrent extractor will be apparent from sectional view of centrifugal countercurrent chemical contactor designated by numeral 4. Illustrations of the countercurrent extractors may be found in U. S. Patents 2,153,640 and 2,670,132.

The solvent oil flowing into extractor 2 through line 3 must be of a different specific gravity than liquor entering through line 1. Desirably, it should be of lighter specific gravity than the liquor and to distinguish it is referred ot sometimes as "light liquid" in contrast to the denser liquor which is designated as "heavy liquor." In addition the light liquid should have a selective affinity for phenol and should be immiscible with water. Examples of solvents for extraction with phenol are benzene, toluene, hydrocarbon fractions rich in aromatics and low molecular weight ethers and esters. The light liquid containing dissolved phenol sometimes termed fat oil after intimate contact with liquor and separation therefrom in extractor 2 discharges through line 5 and valve 6 and is forced by pump 7 through line 8 into centrifugal countercurrent chemical contactor 4. Dephenolized liquor discharges from extractor 2 through line 9 to ammonia still or sewer. The extent of dephenolization of the liquor is dependent to a large extent upon the relative concentration of phenol in the light liquid circulating in the system through line 3 to extractor 2. In conventional processes for effecting removal of phenol from liquor difficulty was always had in returning a washing fluid low in phenol content; of course the washing fluid could be stripped entirely of its phenol content before return to the liquor but the cost and the difficulties inherent in such method made such operations generally impractical. As previously mentioned one item which reflects cost of operation for stripping the solvent oil or the fat oil of phenol is the amount of caustic consumed. In the usual commercial operation 1–1.5 pounds of caustic are usually consumed in the recovery of one pound phenol with an effectiveness of ninety or less percent removal of phenol from the liquor. Stated in other words, assuming a liquor had a concentration of one thousand parts per million phenol, with a consumption of 1–1.5 pounds caustic per pound of phenol recovered, the dephenolized liquor would contain over 100 parts per million phenol. In the present operation using about half the caustic, liquor containing one thousand parts per million phenol will have well over 90% of its phenol content removed leaving a dephenolized liquor of about 60 parts per million phenol. If the same amount of caustic, that is, 1–1.5 pounds caustic per pound phenol recovered, were employed in the process of the present invention, the dephenolized liquor discharging down through line 9 would be reduced to less than about ten parts per million. Again it must be emphasized that while these differences may appear small, nevertheless when multiplied by the vast quantity of liquor to be treated the values assume appreciable importance from the standpoint of economic saving, stream pollution and conservation of resources.

The fat liquor is pumped through line 8 through passageway 11 to near the outside of contactor 4. An aqueous solution of an alkali such as caustic soda (heavy liquid) enters centrifugal countercurrent chemical contactor 4 through line 12 flowing through passageway 13 to about the center of contactor 4. Contactor 4 rotates at a high speed, about 1000–5000 revolutions per minute, developing a centrifugal force as high as 5000 times gravity. Light liquid discharging from passageway 11 proceeds inwardly countercurrent and in intimate contact with heavy liquid discharging through an annular space around line 13 which becomes line 15 external to contactor 4. Quiet zones near the center and near the periphery provide clarification of the light and heavy streams respectively. The caustic soda in the caustic solution reacts with the phenol in the fat oil to form sodium phenolate which remains dissolved in the aqueous solution. The sodium phenolate solution discharges from centrifugal countercurrent chemical contactor 4 through line 14 to conventional treatment for the recovery of phenol. Lean oil, i. e. the fat oil after contact with caustic solution for removal of phenol discharges from centrifugal chemical contactor 4 through line 15. Unless inordinate amounts of caustic are employed for contact with the fat oil the lean oil discharging from chemical contactor 4 through line 15 will contain an appreciable amount of phenol which has not been stripped from it by contact with caustic solution entering through line 12. The efficacy of the process is in large measure dependent upon the degree of stripping of phenol from the fat oil consistent of course with the maintenance of low operating and investment costs and especially low consumption of caustic. Merely as illustrative, assuming an operation in which equilibrium conditions were obtained wherein liquor containing approximately a thousand parts per million phenol is passed through a centrifugal countercurrent extractor 2 in contact with benzol, the benzol would extract about 90% of the phenol from the liquor leaving about 10% in the residual liquor effluent. With a liquor-benzol ratio of about 2:1, the fat oil will contain approximately 2500 p. p. m. phenol consisting of about 1800 p. p. m. phenol extracted from the liquor and 700 p. p. m. phenol residue contained in the recirculated benzol. The fat oil is then passed through a centrifugal countercurrent chemical contactor 4 in contact with caustic solution to effect stripping of the phenol from the benzol. On the basis of the use of 1.2 pounds caustic in the caustic solution per pound of phenol in the liquor the lean oil after contact with the caustic solution will still contain about 700 p. p. m. phenol.

We discovered we could materially reduce the phenol content of lean oil discharging from contactor 4 through line 15 and entering extractor 2 through line 3, often as much as 50% or more, without increase in caustic consumption or conversely reduce caustic consumed by as much as 50% without increase in phenol concentration and with practically negligible additional investment and operating costs. We accomplish this result by diverting a large portion of the lean oil flowing through line 15, at least 25% but not more than 75%, preferably 35–60%, through line 16, valve 17 and line 18 wherein it commingles with an aqueous solution of caustic introduced through line 19 and forced by pump 21 through line 22 into the stream of lean oil flowing through line 18. The mixture of caustic solution and lean oil passes to the suction side of pump 23 thereby causing additional mixing in intimate contact between caustic solution and the lean oil and discharges through line 24 into mixing tank 25 which also acts in the nature of a surge tank and which may be provided with a stirrer for maintaining the contents agitated. Additional mixing and contacting of caustic solution may be accomplished by passing a portion of the mixture discharging through line 26 from mixing tank 25 through local recirculation line 27, valve 28, line 18 into suction side of pump 23 and then returning to mixing tank 25 via line 24. It is most important in the process of the present invention to preliminarily effect intimate contact with a large portion of the lean oil effluent from the chemical contactor with caustic solution and then introduce the mixture of lean oil effluent and caustic solution into the chemical contactor. For reasons which we cannot explain this procedure materially reduces the caustic consumption of the phenol concentration or both and increases the amount of phenol recovery as compared to a conventional operation wherein caustic solution is introduced directly into the centrifugal countercurrent contactor 4. The additional costs are minor involving pump 23, mixing tank 25 and some pipe and the cost of operating pump 23. The mixture of lean oil and caustic solution flows down through lines 26 and 12 and passageway 13 into the interior of contactor 4 a few spaces above the hub which is essentially the separating zone of the centrifuge. Separated lean oil discharging through line 15 flows in part through line 29 and valve 31 and returns by pump to centrifugal countercurrent extractor 2 via line 3.

The temperature of the liquor containing phenol and the bnezol entering centrifugal extractor 2 and the fat oil in caustic solution entering extractor 4 may vary within relatively wide limits from about 10° C. to about 105° C., preferably from 30–60° C. Centrifugal extractor 2 and contactor 4 may be operated at discharge pressures of substantially atmospheric, or preferably operated under superatmospheric pressure, desirably at discharge pressure of 25–75 p. s. i. g. Ordinarily, the initial pressure of the light oil entering the centrifuges will be 50 to 100 p. s. i. higher than the discharge pressure due to friction loss. The ratio of liquor containing phenol to light liquid entering centrifugal countercurrent extractor 2 will vary, depending in part upon the phenol concentration in the liquor and the degree of dephenolization as well as the nature of the solvent. In practice, we have found ratios of solvent to liquor in the proportions of 0.5:1.0 to 3.1 to be satisfactory, preferably in the ratios from 1:1 to 2:1. The ratio of fat oil to caustic solution entering centrifugal contactor 4 will also vary depending in part upon specific materials being treated but in general may be operated with a ratio of fat oil to caustic solution of from 700 to 20:1, preferably 250 to 30:1. The caustic solution may be any suitable alkaline material, preferably sodium hydroxide, which will react with the phenol in the fat oil to form a phenolate such as sodium phenolate. The concentration of caustic in the aqueous solution may be varied from 2 to 30%, preferably 5 to 17%.

The following example illustrates the present invention. Ammoniacal liquor from the coke plant containing 1070 p. p. m. phenol and 9000 p. p. m. acid gases at a temperature of 33° C. and a pressure of 50 p. s. i. g. is introduced at the rate of 120 gallons per hour into a centrifugal extractor comprising a rotating rotor and a series of concentric perforated elements substantially as illustrated in the drawing rotating at a speed of 1900 r. p. m. Recirculated benzol containing 339 p. p. m. phenol at a temperature of 44° C. and a pressure of 80 p. s. i. g. is introduced at a point near the periphery of the centrifugal extractor at the rate of 73 gallons per hour. Resultant dephenolized liquor discharging from the centrifugal extractor contained 66 p. p. m. phenol thus giving an effective removal of about 94% of the phenol from the liquor. The benzol at a temperature of 40° C. after contact with liquor and containing dissolved phenol in an amount of 2000 p. p. m. is pumped at the rate of 73 gallons per hour at 125 p. s. i. g. into a second centrifugal contactor the same in construction as the first centrifugal contactor. The centrifugal chemical contactor operates at a speed of 1600 r. p. m. An aqueous caustic solution having a concentration of 24% sodium hydroxide is pumped at temperature of 28° C. and a pressure of 35 p. s. i. g. at a rate of 0.28 gallon per hour (equivalent to 0.635 pound caustic per pound phenol in the liquor entering the first extractor) and admixed with a portion of the lean benzol leaving the second contactor, which portion constitutes 70 percent of the total stream of lean benzol and amounts to 168 gallons per hour. The mixture of aqueous caustic solution and lean oil is sent to the suction side of the pump and forced through a mixing tank thence into the second contactor in intimate contact with the benzol containing dissolved phenol and reacts therewith to form sodium phenolate which remains in solution in the aqueous caustic solution. The sodium phenolate solution is discharged to conventional phenol recovery. The remaining benzol leaving the centrifugal countercurrent chemical contactor is recirculated to the first centrifugal extractor for further removal of phenol from the liquor. Thus 94% of the phenol in the liquor is removed and recovered with the consumption of only 0.635 pound caustic per pound of phenol. Increasing the amount of caustic to 1 pound caustic per pound phenol increases the recovery of phenol from the liquor to over 99% and reduces the phenol content in the dephenolized liquor to 8 p. p. m. In comparative tests wherein the procedure of withdrawal of a large portion of the dephenolized benzol followed by preliminary contact and mixing of this dephenolized benzol with caustic and introduction of this mixture into the chemical contactor was not followed, the consumption of twice the amount of caustic did not effect as complete dephenolization and recovery of phenol from the liquor.

In the course of our study of comparative operations with and without pretreatment of the portion of dephenolized benzol as described earlier, we noted that the sodium phenolate solution resulting from an operation without the pretreatment contained appreciable amounts of NaOH whereas in the operation with the pretreatment there was practically zero NaOH in the sodium phenolate solution. Further, we noted that there existed in the sodium phenolate solution resulting from an operation without the pretreatment a higher proportion of sodium sulfide and sodium carbonate than with the operation in which pretreatment was carried out indicating that an appreciable amount of the sodium hydroxide in the first operation wastefully was consumed in neutralizing acid gases.

Although certain preferred embodiments of the invention have been disclosed for purpose of illustration it will be evident that various changes and modifications may be made therein without departing from the scope and spirit of the invention.

We claim:

1. A process for the removal and recovery of phenol from aqueous liquor containing phenol which comprises passing the aqueous liquor through a centrifugal countercurrent extractor countercurrent to and in intimate contact with a liquid solvent having a selective affinity for phenol which is immiscible in water and has a lower specific gravity than water to effect extraction of phenol from the liquor, discharging the dephenolized liquor from the centrifugal countercurrent extractor, passing the solvent light liquid containing dissolved phenol through a second centrifugal countercurrent contactor countercurrent to and in intimate contact with an aqueous caustic solution which has a specific gravity greater than the solvent light liquid to effect removal of the phenol from the solvent light liquid and reaction of the phenol with the caustic to form a phenolate solution, discharging the phenolate solution from the second centrifugal countercurrent contactor, discharging solvent liquid after contact with the caustic solution from the second centrifugal countercurrent contactor, recycling one portion of said solvent liquid for contact with liquor containing phenol in the first centrifugal countercurrent extractor, intimately admixing caustic solution with another portion of said liquid solvent from the second centrifugal countercurrent contactor and passing said mixture of liquid solvent and caustic solution into the second centrifugal countercurrent contactor at a point near its center wherein separation of the intimate mixture of liquid solvent and caustic solution into its components occurs as it passes through the second centrifugal contactor with the separated caustic solution continuing countercurrent to solvent liquid containing dissolved phenol introduced into the second contactor, and the liquid solvent from the intimate mixture dispersing in said countercurrent flowing solvent liquid and discharging therewith from the second contactor.

2. A process for the removal and recovery of phenol from aqueous liquor containing phenol which comprises passing the aqueous liquor through a centrifugal countercurrent extractor countercurrent to and in intimate contact with a liquid solvent having a selective affinity for phenol which is immiscible in water and has a lower specific gravity than water to effect extraction of phenol from the liquor, discharging the dephenolized liquor from the centrifugal countercurrent extractor, passing the solvent light liquid containing dissolved phenol through a second centrifugal countercurrent contactor countercurrent to and in intimate contact with an aqueous caustic solution which has a specific gravity greater than the solvent light liquid to effect removal of the phenol from the solvent light liquid and reaction of the phenol with the caustic to form a phenolate solution, discharging the phenolate solution from the second centrifugal countercurrent contactor, discharging solvent liquid after contact with the caustic solution from the second centrifugal countercurrent contactor, recycling one portion of said solvent liquid for contact with liquor containing phenol in the first centrifugal countercurrent extractor, passing another portion of the liquid solvent from the second centrifugal countercurrent contactor in a stream to the suction side of a pump, commingling an aqueous caustic solution with the stream of liquid solvent on the suction side of the pump, discharging the mixture of solvent liquid and aqueous caustic solution from the pump into a mixing tank, locally recirculating a portion of the mixture of solvent liquid and caustic solution from the mixing tank to the suction side of the pump thereby aiding in effecting intimate admixture between caustic solution and the liquid solvent, and passing said intimate mixture of liquid solvent and caustic solution from the mixing tank into the second centrifugal countercurrent contactor at a point near its center wherein separation of the intimate mixture of liquid solvent and caustic solution into its components occurs as it passes through the second centrifugal contactor with the separated caustic solution continuing countercurrent to solvent liquid containing dissolved phenol introduced into the second contactor, and the liquid solvent from the intimate mixture dispersing in said countercurrent flowing solvent liquid and discharging therewith from the second contactor.

3. A process for the removal and recovery of phenol from aqueous liquor containing phenol which comprises passing the aqueous liquor through a centrifugal countercurrent extractor countercurrent to and in intimate contact with a liquid solvent having a selective affinity for phenol which is immiscible in water and has a lower specific gravity than water to effect extraction of phenol from the liquor, discharging the dephenolized liquor from the centrifugal countercurrent extractor, passing the solvent light liquid containing dissolved phenol through a second centrifugal countercurrent contactor countercurrent to and in intimate contact with an aqueous caustic solution which has a specific gravity greater than the solvent light liquid to effect removal of the phenol from the solvent light liquid and reaction of the phenol with the caustic to form a phenolate solution, discharging the phenolate solution from the second centrifugal countercurrent contactor, discharging solvent liquid after contact with the caustic solution from the second centrifugal countercurrent contactor, intimately admixing at least 25% but not more than 75% by volume of the liquid solvent from the second centrifugal countercurrent contactor with caustic solution, passing said intimate mixture of liquid solvent and caustic solution into the second centrifugal countercurrent contactor at a point near its center wherein separation of the intimate mixture of liquid solvent and caustic solution into its components occurs as it passes through the second centrifugal contactor with the separated caustic solution continuing countercurrent to solvent liquid containing dissolved phenol introduced into the second contactor, and the liquid solvent from the intimate mixture dispersing in said countercurrent flowing solvent liquid and discharging therewith from the second contactor, and recycling another portion of said solvent liquid from the second centrifugal countercurrent contactor for contact with waste liquor containing phenol in the first centrifugal countercurrent contactor.

4. A process for the removal and recovery of phenol from coke-plant ammonia liquor which comprises passing the coke-plant ammonia liquor through a centrifugal countercurrent contactor countercurrent to and in intimate contact with a liquid solvent having a selective affinity for phenol which is immiscible in water and has a lower specific gravity than water in the proportion of 0.33–2.0 volumes coke-plant ammonia liquor to one volume liquid solvent, to effect extraction of phenol, discharging dephenolized coke-plant ammonia liquor from the centrifugal countercurrent contactor, passing the solvent light liquid containing dissolved phenol through a second centrifugal countercurrent contactor countercurrent to and in intimate contact with an aqueous caustic solution which has a specific gravity greater than the solvent light liquid in the proportion of 700–20 volumes of solvent liquid to one volume of caustic solution to effect removal of the phenol from the solvent light liquid and reaction of the phenol with the caustic to form a phenolate solution, discharging the phenolate solution from the second centrifugal countercurrent contactor, discharging solvent liquid from the second centrifugal countercurrent contactor after contact with the caustic solution, intimately admixing 35–60% by volume of the liquid solvent from the second centrifugal countercurrent contactor with caustic solution, passing said intimate mixture of liquid solvent and caustic solution into the second centrifugal countercurrent contactor at a point near its center wherein separation of the intimate mixture of liquid solvent and caustic solution into its components occurs as it passes through the second centrifugal contactor with the separated caustic solution continuing countercurrent to solvent liquid containing dissolved phenol introduced into the second contactor, and the liquid solvent from the intimate mixture dispersing in said countercurrent flowing solvent liquid and discharging therewith from the second contactor, and recycling another portion of said solvent liquid from the second centrifugal countercurrent contactor for contact with liquor containing phenol in the first centrifugal countercurrent contactor.

5. A process for the removal and recovery of phenol from coke-plant ammonia liquor which comprises passing the coke-plant ammonia liquor at a temperature between 10–105° C. through a centrifugal countercurrent contactor maintained under superatmospheric pressure of about 25–75 p. s. i. g. and in intimate contact with benzol at a temperature between 10–105° C., in the proportion 0.5–1 volume coke-plant ammonia liquor to 1 volume benzol, discharging the dephenolized coke-plant ammonia liquor from the centrifugal countercurrent contactor, passing the benzol containing dissolved phenol through a second centrifugal countercurrent contactor maintained under superatmospheric pressure of about 125 to 25 p. s. i. g. in intimate contact with an aqueous caustic solution which has a specific gravity greater than the benzol in the proportion of 250–30 volumes of benzol to 1 volume of caustic solution to effect removal of the phenol from the benzol and reaction with the caustic to form a phenolate solution, discharging the phenolate solution from the second centrifugal countercurrent contactor, discharging the benzol from the second centrifugal countercurrent contactor after contact with the caustic solution, recycling one portion of said benzol for contact with coke-plant ammonia liquor containing phenol in the first centrifugal countercurrent extractor, passing 35–60% by volume of the benzol from the second centrifugal countercurrent contactor in a stream to the suction side of a pump, commingling an aqueous caustic solution with the stream of benzol on the suction side of the pump, discharging the mixture of benzol and aqueous caustic solution from the pump into a mixing tank, locally recirculating a portion of the mixture of benzol and caustic solution from the mixing tank to the suction side of the pump thereby aiding in effecting intimate admixture between caustic solution and the benzol, and passing said intimate mixture of benzol and caustic solution from the mixing tank into the second centrifugal countercurrent contactor at a point near its center wherein separation of the intimate mixture of benzol and caustic solution into its components occurs as it passes through the second centrifugal contactor with the separated caustic solution continuing countercurrent to benzol containing dissolved phenol introduced into the second contactor, and the benzol from the intimate mixture dispersing in said countercurrent flowing benzol and discharging therewith from the second contactor.

References Cited in the file of this patent

UNITED STATES PATENTS

| | | |
|---|---|---|
| 1,989,177 | Tiddy | Jan. 29, 1935 |
| 2,153,640 | Podbielniak | Apr. 11, 1939 |
| 2,670,132 | Podbielniak | Feb. 23, 1954 |